United States Patent
Kim

Patent Number: 5,815,730
Date of Patent: Sep. 29, 1998

[54] METHOD AND SYSTEM FOR GENERATING MULTI-INDEX AUDIO DATA INCLUDING A HEADER INDICATING DATA QUANTITY, STARTING POSITION INFORMATION OF AN INDEX, AUDIO DATA, AND AT LEAST ONE INDEX

[75] Inventor: Han-sang Kim, Seoul, Rep. of Korea

[73] Assignee: Samsung Electronics Co., Ltd., Rep. of Korea

[21] Appl. No.: 588,084

[22] Filed: Jan. 18, 1996

[30] Foreign Application Priority Data

Jan. 19, 1995 [KR] Rep. of Korea .......................... 95-846

[51] Int. Cl.⁶ ............................................. G06F 3/00
[52] U.S. Cl. .................... 395/825; 369/47; 369/86
[58] Field of Search ............................. 395/821; 386/106; 358/341, 335

[56] References Cited

U.S. PATENT DOCUMENTS

| | | | |
|---|---|---|---|
| 5,132,807 | 7/1992 | Takimoto et al. ................. | 358/335 |
| 5,163,136 | 11/1992 | Richmond ........................ | 395/275 |
| 5,249,289 | 9/1993 | Thamm et al. ................... | 395/600 |
| 5,396,338 | 3/1995 | Sato et al. ....................... | 358/341 |
| 5,589,995 | 12/1996 | Saito et al. ...................... | 360/48 |
| 5,625,740 | 4/1997 | Sato et al. ....................... | 386/106 |

FOREIGN PATENT DOCUMENTS

| | | |
|---|---|---|
| 60-3991 | 1/1985 | Japan . |
| 2282978 | 11/1990 | Japan . |
| 4247326 | 9/1992 | Japan . |
| 4256295 | 9/1992 | Japan . |
| 4259978 | 9/1992 | Japan . |
| 4321988 | 11/1992 | Japan . |
| 636530 | 2/1994 | Japan . |
| 689555 | 3/1994 | Japan . |
| 6195945 | 7/1994 | Japan . |
| 6309853 | 11/1994 | Japan . |

OTHER PUBLICATIONS

Microsoft Corporation, 1992, "Multimedia Programmer's Reference" pp. 8–23—8–27 (Wave).

Primary Examiner—Thomas C. Lee
Assistant Examiner—Anderson I. Chen
Attorney, Agent, or Firm—Leydig, Voit & Mayer

[57] ABSTRACT

An audio data recording/reproducing method and apparatus for storing an index containing additional information and position information together with audio data in order to more easily manage the audio data. During reproduction of the audio data, using the stored index, the reproduction position is selected by a user and additional information can be utilized.

11 Claims, 6 Drawing Sheets

METHOD AND SYSTEM FOR GENERATING MULTI-INDEX AUDIO DATA INCLUDING A HEADER INDICATING DATA QUANTITY, STARTING POSITION INFORMATION OF AN INDEX, AUDIO DATA, AND AT LEAST ONE INDEX

BACKGROUND OF THE INVENTION

The present invention relates to a method and apparatus for recording and/or reproducing an audio signal, and more particularly, to a method and apparatus for recording and/or reproducing an audio signal wherein an index is also generated and which is to be recorded/reproduced together with the audio signal in response to a user's request.

Recently, as multi-media information systems become more widely used, there has been a corresponding increase in the development of instruments and systems for storing audio signals. In view of a process of digitizing such audio signals, the audio signal input through a microphone or an external source is converted into a digital format signal for storage. Otherwise, the audio signal to be stored is converted to digital format by means of a dedicated converting device. However, according to such conventional storing methods, the audio signal may be stored with or without monitoring data, such as a name or generation date, but generally does not include position information.

Therefore, since the conventional audio data storing methods do not incorporate position information, when working with large quantities of audio data, it is difficult to locate, e.g., access the desired audio data.

SUMMARY OF THE INVENTION

It is an object of the present invention to provide a method for recording audio data whereby an index containing the position information of the corresponding audio data is generated and multi-index audio data containing audio data and index information is generated and recorded in response to a user's request for the generation of index information, in order to facilitate the efficient management of audio data.

Also, it is a further object of the present invention to provide a method for reproducing audio data whereby a user can select a reproduction position optionally through multi-index audio data.

It is a further object of the present invention to provide an apparatus for recording audio data using the audio data recording method of the present invention.

It is a further object of the present invention to provide an apparatus for reproducing audio data using the audio data reproducing method of the present invention.

It is a further object of the present invention to provide a method for recording and reproducing audio data whereby an index containing the position information of the corresponding audio data is generated and multi-index audio data containing audio data and the index is generated and recorded in response to a user's request for the generation of the index so as to facilitate to the management of audio data, and the recorded multi-index audio data is discriminated and reproduced from the corresponding reproduction position according to a user's selection of the reproduction position.

It is a further object of the present invention to provide an apparatus for recording and reproducing audio data using the audio data recording and reproducing method of the present invention.

To accomplish the above objects of the present invention, a method for recording audio data according to the present invention comprises converting an audio signal into a digital format audio data signal, determining the presence or absence of a request for index generation, generating an index corresponding to the digital format audio data if there is a request for index generation in the determining step, storing the digital format audio data, determining the presence or absence of a request for recording termination, generating multi-index audio data containing the audio data and index if there is a request for recording termination, and determining the presence or absence of a request for index generation.

The index generating step includes storing a corresponding address count, preparing additional information of audio data corresponding to the index, adding one to the index count, generating a header, and storing the index.

The multi-index audio data includes at least a header portion and audio data portion and at least one index. The header portion has header information and initial index starting position information, and the index includes at least starting position information of the corresponding audio data and the following index, additional information and the position information thereof.

To accomplish a further object of the present invention, the audio data generating method according to the present invention comprises discriminating multi-index audio data containing a header portion, an audio data portion and an index portion having at least one index including position information of the corresponding audio data, detecting the header and initial index starting position information of the multi-index audio data, inputting a reproduction position, searching an index corresponding to the reproduction position, generating reproduction starting and terminating addresses of the corresponding audio data by the index searched in the searching step, and reproducing audio data from the reproduction starting address to the reproduction terminating address.

The reproduction position inputting step includes the steps of discriminating an index according to the initial index starting position information, displaying the discriminated index on a screen, and selecting the index displayed on the screen in response to a user's input.

To accomplish a further object of the present invention, the audio data recording apparatus according to the present invention comprises means for outputting a corresponding signal depending on a user's selection of operation control, analog-to-digital converting means for converting an audio signal into a digital signal in response to a control signal, audio signal processing means for outputting the control signal in response to a recording starting signal supplied through the outputting means or supplied externally, receiving the digitally converted audio data and generating index containing position information of the audio data in response to the index generation request signal supplied through the outputting means or supplied externally, and storing means for storing multi-index audio data containing the audio data and at least one index.

To accomplish a further object of the present invention, the audio data reproducing apparatus according to the present invention comprises storing means for storing multi-index audio data containing audio data and at least one index having position information corresponding to the audio data, and reproducing means for discriminating the stored multi-index audio data, detecting the index in response to a user's selection of reproduction position, and reproducing the audio data from the reproduction position thereof by the position information of the audio data of the detected index.

To accomplish a further object of the present invention, there is provided an audio data recording and reproducing method comprising the steps of recording audio data and reproducing the same, wherein the recording step includes the steps of converting an audio signal into a digital format signal, determining the presence or absence of a request for index generation, generating an index corresponding to the digitally converted audio data if there is a request for index generation in the determining step, storing the audio data, determining the presence or absence of a request for recording termination, generating multi-index audio data containing the audio data and index if there is a request for recording termination, and determining the presence or absence of a request for index generation, and wherein the reproducing step includes the steps of determining the presence or absence of a request for reproduction, discriminating multi-index audio data if there is a request for reproduction, detecting the header of the multi-index audio data and initial index starting position information, inputting a reproduction position, searching an index corresponding to the reproduction position, generating reproduction starting and terminating addresses of the audio data by the index searched in the searching step, and reproducing audio data from the reproduction starting address to the reproduction terminating address.

To accomplish another object of the present invention, the audio data recording and reproducing apparatus comprises audio data recording means for receiving the digitally converted audio data, generating an index containing position information of the audio data in response to a user's request for generation of index and recording multi-index audio data containing the audio data and the index, and reproducing means for discriminating the recorded multi-index audio data, detecting the index in response to a user's selection of reproduction position, and reproducing the audio data from the reproduction position thereof by the position information of the audio data of the detected index.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
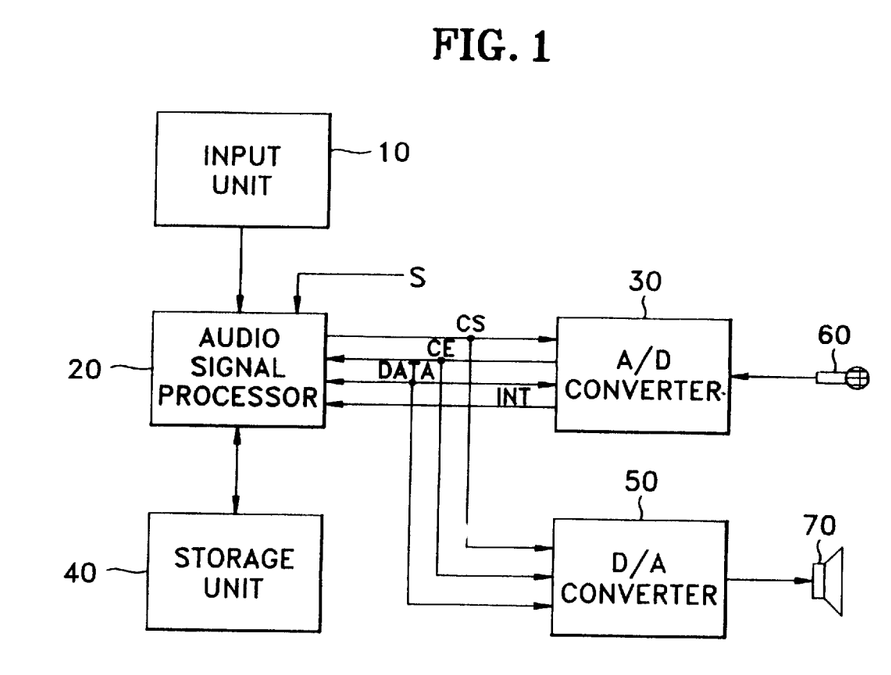
FIG. 1 is a block diagram of an audio signal recording and/or reproducing apparatus according to the present invention.

In FIG. 1, the audio signal recording and reproducing apparatus includes an input unit 10, an audio signal processor 20, an analog-to-digital converter 30, a storage unit 40, a digital-to-analog converter 50, a microphone 60 and a speaker 70. The input unit 10 can be any input means capable of controlling a user's desired operation such as a general purpose keypad or remote controller.

The analog-to-digital (A/D) converter 30 starts a digital conversion in response to a conversion starting signal CS from the audio signal processor 20 and transmits the converted audio data to the audio signal processor 20 after completing the conversion in a predetermined time period. At this time, the audio signal processor 20 outputs the conversion starting signal CS to the A/D converter 30 in response to a control signal supplied from the input unit 10 or an external control signal S, receives audio data in response to an interrupt signal INT from the A/D converter 30 and temporarily stores the received audio data in the storage unit 40. At this time, the storage unit 40 is monitored by a dedicated program or operating system, with a main memory device such as a RAM and/or an auxiliary memory device such as a hard disk, and stores the audio data in response to a control signal from the audio signal processor 20. Also, the audio signal processor 20 generates an index for the corresponding audio signal in response to an index generation request signal through input unit 10 and temporarily stores the generated index in the storage unit 40.

In response to a recording termination signal through input unit 10 or an interrupt signal INT from the A/D converter 30, the temporarily stored audio signal and index are rearranged in the storage unit 40 for eventual reproduction. Subsequently, the audio signal processor 30 outputs the conversion starting signal CS to the D/A converter 50 in response to a control signal from the input unit 10 or an external control signal S, and reads the rearranged audio data from the storage unit 40 to supply the audio data to the D/A converter 50. At this time, the D/A converter 50 receives the audio data from the audio signal processor 20, converts the received audio data into an analog signal and outputs the analog signal to the speaker 70.

The above-described operation will be described in detail with reference to FIG. 2.

Figure 2:
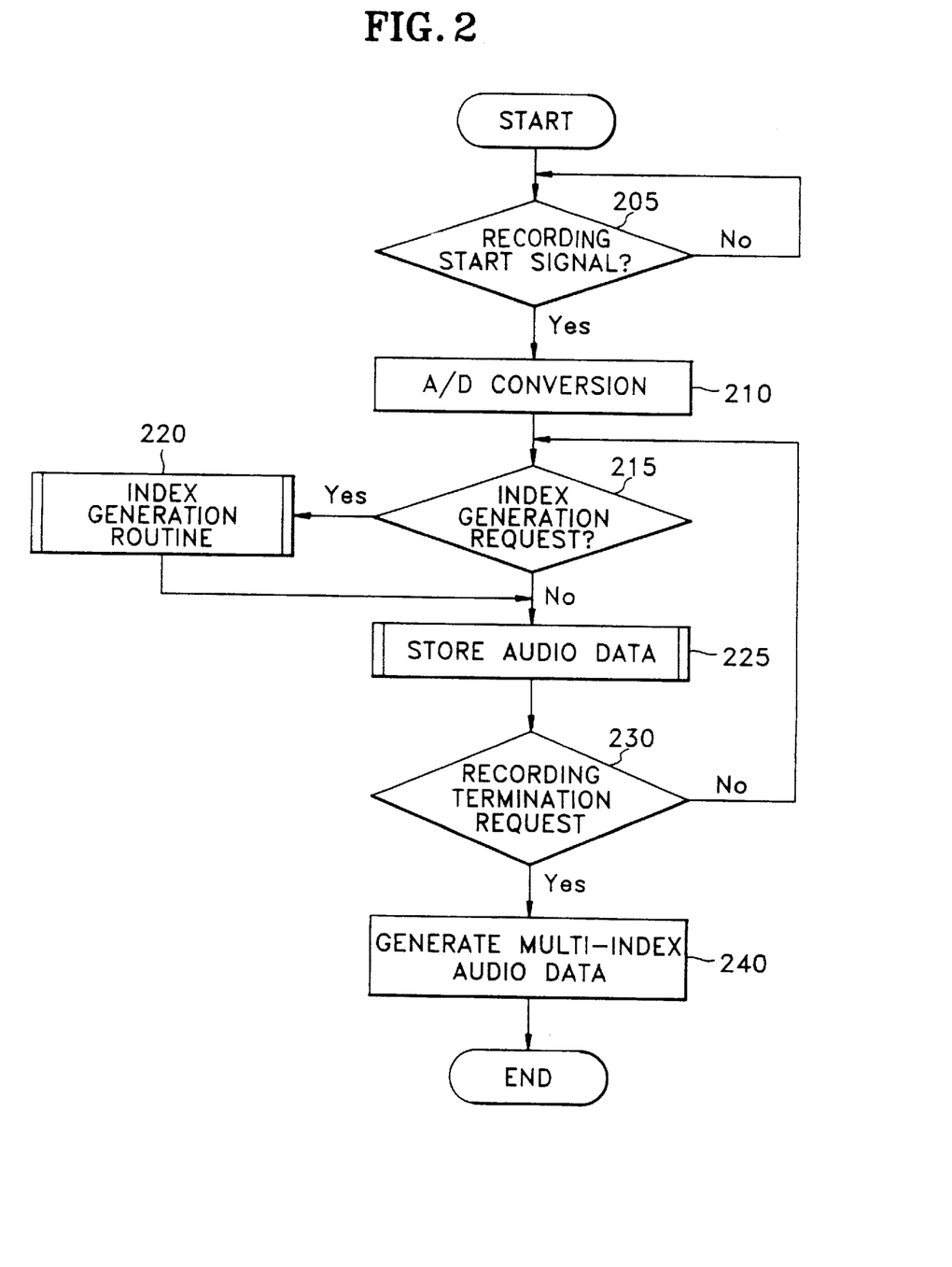
FIG. 2 is a flowchart for explaining an audio signal recording method by the audio signal recording and/or reproducing apparatus according to the present invention.

FIG. 2 is a flowchart outlining an audio signal recording method implemented by the audio signal recording and/or reproducing apparatus according to the present invention.

First, the audio signal processor 20 determines whether there is a control signal from the input unit 10, or an external control signal S for indicating a recording start (step 205). At this time, particularly, the external control signal S may be a control signal input from a user's dedicated device for the reservation of recording and/or reproducing audio data or a timer (not shown). Subsequently, the audio signal processor 20 outputs a conversion starting signal CS to the A/D converter 30 to initiate a conversion of the analog format audio signal input from microphone 60 into a digital format audio signal (step 210). Next, the audio signal processor 20 determines whether there is an index generation request signal from the input unit 10 or an external input (step 215). If there is an index generation request signal in step 215, the index is generated (step 220). At this time, in step 220, the index is generated via an index generation routine.

Figure 3:
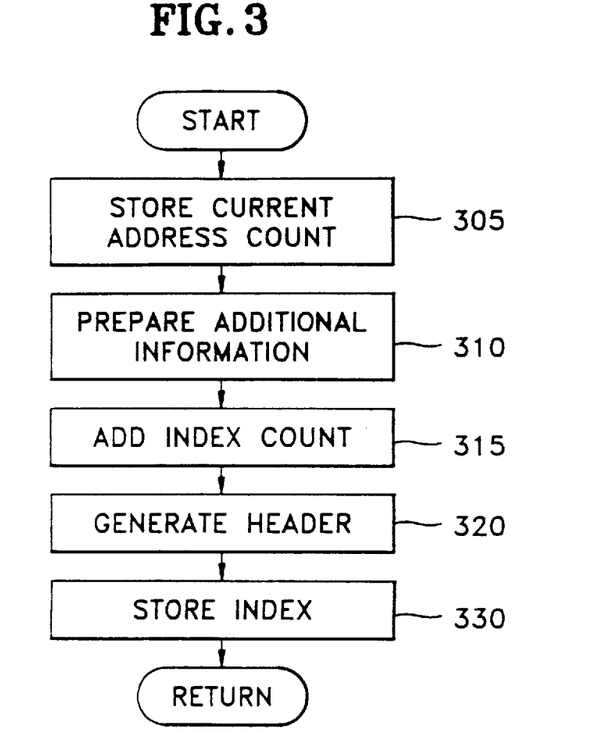
FIG. 3 is a flowchart for explaining in more detail the index generation routine shown in FIG. 2.

Referring to FIG. 3, the index generation routine will be described.

In the first step of the index generation routine, a current address count is stored (step 305). The current address count is stored in order to obtain the relative memory position of each index generated for searching a desired reproduction position during a reproduction. Then, additional information is prepared (step 310). At this time, the additional information may include a caption of the corresponding audio data, a user's memo on the audio data or the time. Subsequently, the index count is updated (step 315), a header is generated (step 320), and the generated index is stored (step 330). Upon completion of the store index step 330 of the index generation routine, the next step in the audio signal recording method is implemented.

Figure 4:
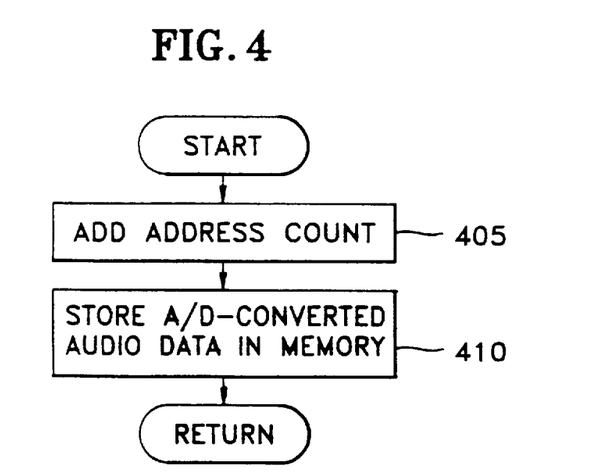
FIG. 4 is a flowchart for explaining in more detail the process for storing audio data by the interrupt shown in FIG. 2.

The next step in the audio signal recording method, as illustrated in FIG. 2, is the digital audio data is stored (step 225). At this time, step 225 includes a step of adding an address count (step 405) and storing the converted data in a memory (step 410), as shown in FIG. 4. Then, the audio signal processor 20 determines the presence or absence of a recording termination request signal (step 230). Next, if there is no recording termination request signal in step 230, the processes are repeated from step 215. If there is a recording termination request signal in step 230, the multi-index audio data containing the index and audio data is generated (step 240).

Figure 5:
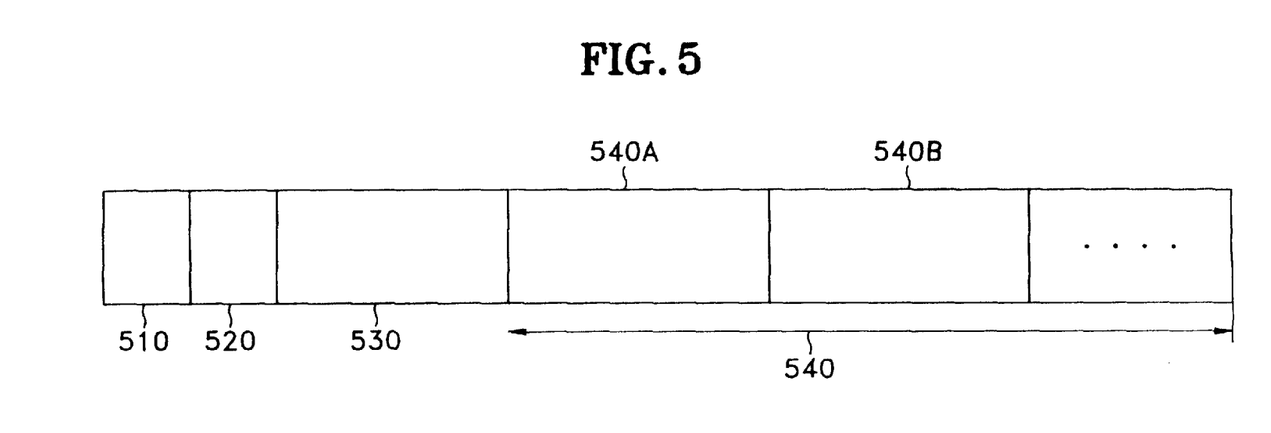
FIG. 5 shows the data format of a multi-index audio data.

FIG. 5 shows a data format for the multi-index audio data generated in step 240.

The index generated in step 220 and digital format audio data are finally rearranged into a suitable data format (FIG. 5) in step 240. The data format for the multi-index audio data comprises a header area 510, an initial index starting position information area 520, an audio data area 530 and an index area 540. At this time, the header area 510 has a value corresponding to the size of the initial index starting position information area 520. The initial index starting position information area 520 has a relative address with respect to a starting position of the index area 540 from a starting address of a physical memory location where audio data is stored. The audio data area 530 is an area for storing the digital format audio data. Also, the index area 540 includes a plurality of indexes (540A, 540B, . . . ).

Figure 6:
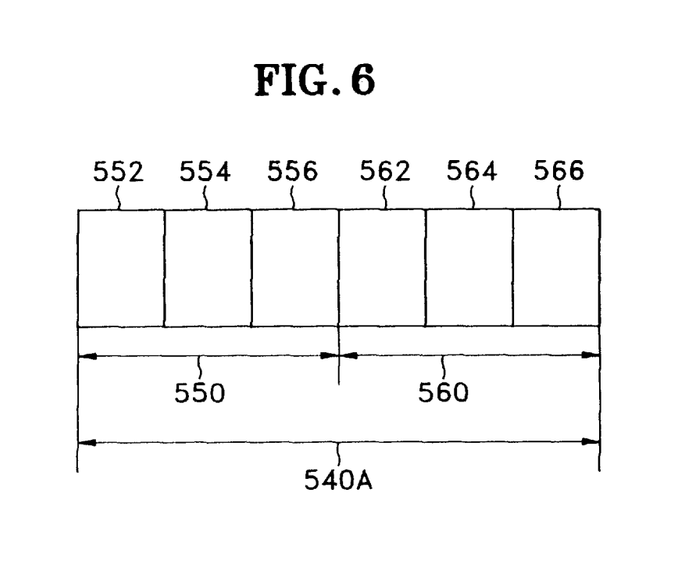
FIG. 6 shows in more detail an index of the multi-index audio data shown in FIG. 5.

FIG. 6 shows an example of an index, for example, a first index 540A, among a plurality of indexes in the index area 540, for providing a detailed explanation of an index of the multi-index audio data shown in FIG. 5. The first index area 540A is divided into a first index position information area 550 and an index information area 560. At this time, the index position information area 550 includes a relevant index audio data starting position information area 552 having a relative address value representing a starting position of audio data corresponding to the first index 540A, a next index audio data starting position information area 554 and an additional information position information area 556. Also, the index information area 560 includes a caption area 562, a memo area 564 and a time area 566. At this time, the index information area 560 depends on a user's need and may be added to or changed with the additional information position information area 556 according to the characteristics of the audio data.

Figure 7:
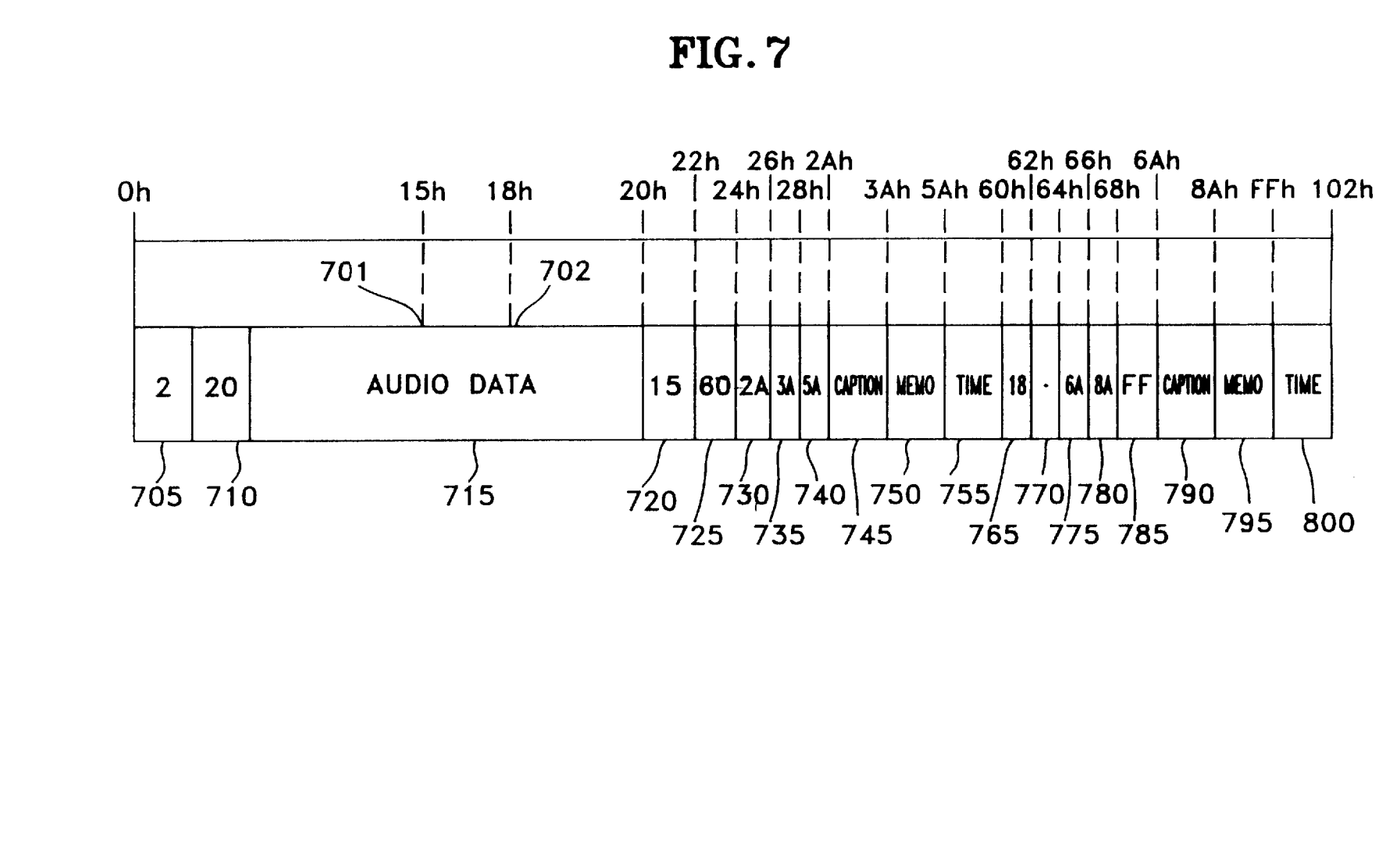
FIG. 7 shows an example for explaining a process of generating multi-index audio data.

FIG. 7 provides an example for explaining the operation of the generation of two indexes during recording by the audio signal recording and reproducing apparatus shown in FIG. 1. Reference numerals 701 and 702 denote the corresponding audio data portions on a user's index generation request. Reference numerals 705 and 710 denote a header and an initial index starting position information area, respectively. Reference numeral 715 denotes an audio data area. A first index area is denoted by 720, 725, 730, 735, 740, 745, 750 and 755 and a second index area is denoted by 765, 770, 780, 785, 790, 795 and 800. Values represented in the respective areas in FIG. 7 are hexadecimal values. That is, a data value 2 of the header area 705 means a data size value of areas having an address value, and values of areas other than the header area 705 means address values for the positions intended to indicate. The first index is generated when the user requests the generation of a first index at an address "15h" of audio data 701, and the second index is generated when the user requests the generation of a second index at an address "18h" of audio data 702. In the first index area, the corresponding index audio data starting position information area 720 has an address value "15h" of the starting position of the audio data corresponding to the first index. The next index starting position information area 725 has an address value "60h" of the starting position of the second index. The additional information position information areas 730, 735 and 740 of the first index have the address values "2A," "3A" and "5A" for the starting positions of the additional information, indicating caption, memo and time, respectively. Subsequently, in the second index area, the corresponding index audio data starting position information area 765 has an address value "18h" of the starting position of the audio data corresponding to the second index. The next index starting position information area 770 has no address value since it has no index to follow. The additional information position information areas 775, 780 and 785 of the second index have the address values "6A," "8A" and "FF" for the starting positions of the additional information, indicating caption, memo and time, respectively.

Figure 8:
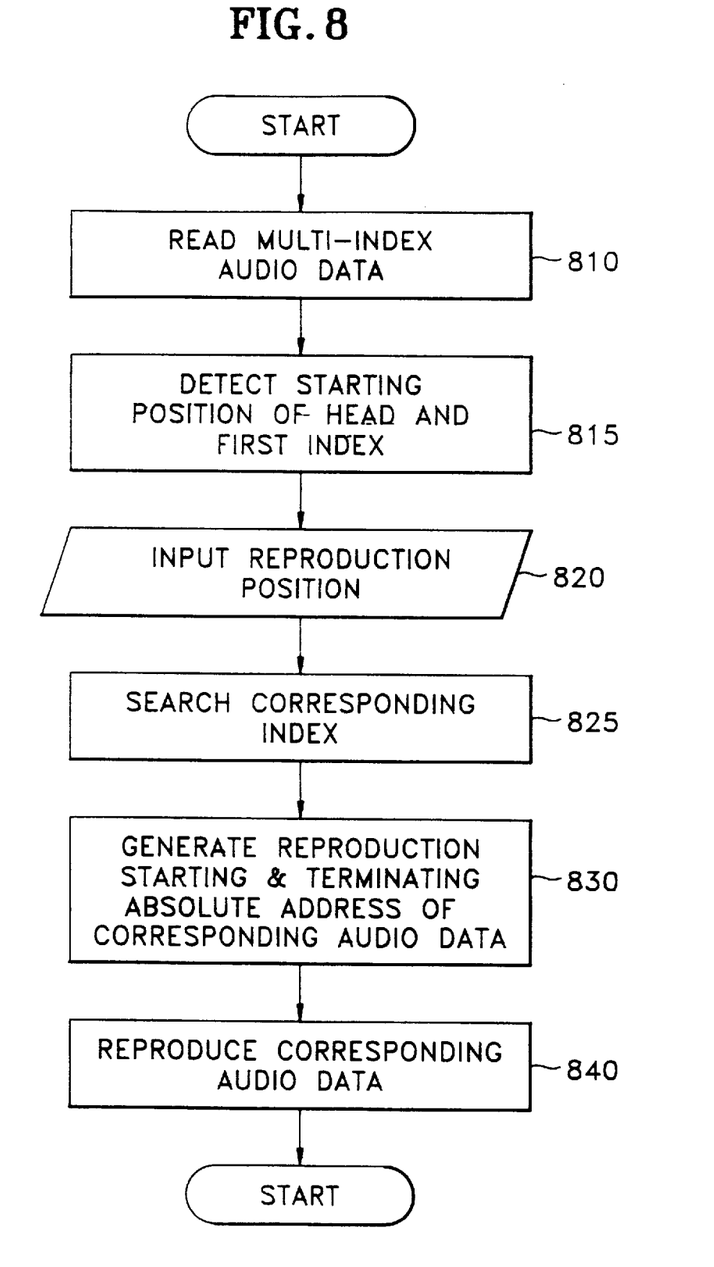
FIG. 8 is a flowchart for explaining an audio data reproducing method of the audio signal recording and/or reproducing apparatus shown in FIG. 1.

FIG. 8 is a flowchart for explaining a reproduction method for the audio signal recording and reproducing apparatus shown in FIG. 1.

First, the audio signal processor 20 reads multi-index audio data stored in the storage unit 40 in response to a control signal from an input device 10 or an external control signal S (step 810). At this time, if there is a main memory, the audio signal processor 20 reads the data into the main memory. Subsequently, a header and first index starting position is detected (step 815). Next, according to the user's selection, a reproduction position is input. At this time, the user selects a displayed index through a screen display device (not shown) or selects a reproduction position through additional information within the respective indexes. Therefore, the method may include a step for displaying, on a screen, the additional information of the respective indexes through index starting position information detected in step 815 (step 820). Subsequently, an index corresponding to the reproduction position selected in step 820 is searched. That is, the corresponding index is searched through the position information of the respective indexes within the multi-index audio data (step 825). Each absolute address for the reproduction starting position selected through position information of the index searched in step 825, i.e., audio data starting position information and absolute address for the reproduction terminating position selected through audio data starting position information of the next index is generated (step 830). Next, audio data is generated from the absolute address for the reproduction starting position. That is, D/A conversion is performed and the converted data is output via a speaker (step 840).

As described above, according to the present invention, an audio signal is converted into a digital format, an index is generated upon a user's request during storage and is stored together with the converted audio data. The reproduction position is selected and desired audio data is easily searched and reproduced through additional information of reproduction position and corresponding audio data during reproduction. Also, according to the present invention, the relative address is used from the initial position where the multi-index audio data is stored to the corresponding data position without using an absolute address. Therefore, any memory device can be adopted directly for the present invention.

What is claimed is:

1. An audio data recording method comprising:
    converting an audio signal into digital audio data;
    determining the presence or absence of a request for index generation;
    generating an index corresponding to the digital audio data in response to a request for index generation;
    storing the digital audio data;
    determining the presence or absence of a request for recording termination; and
    generating multi-index audio data containing the digital audio data and the index in response to a request for recording termination, wherein generating the multi-index audio data includes generating a least a header portion, an audio data portion, and at least one index, wherein the header portion has header information and initial index starting position information, and wherein the index includes at least starting position information of the corresponding audio data and the following index, additional information, and position information for the additional information.

2. The audio data recording method as claimed in claim 1, wherein the index generating step includes:
    storing a corresponding address count;
    preparing additional information for the digital audio data corresponding to the index;
    adding one to the index count;
    generating a header; and
    storing the index.

3. The audio data recording method as claimed in claim 1, wherein the initial index position information, the next index starting position information, and the additional information starting position information each have a relative address with respect to an initial data position of the multi-index audio data.

4. An audio data reproducing method comprising:
    discriminating multi-index audio data containing a header portion, an audio data portion, and an index portion including at least one index including position information of corresponding audio data;
    detecting the header and initial index starting position information of the multi-index audio data;
    inputting a reproduction position;
    searching an index corresponding to the reproduction position;
    generating reproduction starting and terminating addresses of the corresponding audio data according to the index searched; and
    reproducing audio data from the reproduction starting address to the reproduction terminating address, wherein the initial index position information and audio data position information each have a relative address with respect to an initial data position of the multi-index audio data.

5. The audio data reproducing method as claimed in claim 4, wherein said reproduction position inputting step includes:
    discriminating the index according to the initial index starting position information;
    displaying the index on a screen; and selecting the index displayed on the screen in response to an input from a user.

6. An audio data recording apparatus comprising:
    means for generating a signal corresponding to a selection of operation control by a user;
    analog-to-digital converting means for converting an audio signal into digital audio data in response to a control signal;
    audio signal processing means for outputting the control signal in response to a recording starting signal supplied through said means for generating or supplied externally, receiving the digital audio data, and generating an index containing position information of the digital audio data in response to an index generation request signal supplied through said audio signal processing means or supplied externally, and
    storing means for storing multi-index audio data containing the digital audio data and at least one index, wherein the multi-index audio data comprises:
        a header indicating data quantity;
        starting position information of an initial index;
        audio data; and
        at least one index, wherein the starting position information of the initial index has a relative address with respect to the initial data position of the multi-index audio data.

7. The audio data recording apparatus as claimed in claim 6, wherein the index includes position information and additional information, and the position information includes at least a corresponding audio data position, a following index position, and an additional information position.

8. The audio data recording apparatus as claimed in claim 6, wherein the position information has a relative address with respect to the initial data position of the multi-index audio data.

9. An audio data reproducing apparatus comprising:
    storing means for storing multi-index audio data containing audio data and at least one index having position information for the audio data, wherein the multi-index audio data comprises:
        a header indicating data quantity,
        starting position information of the index,
        the audio data, and wherein the index includes audio data position information, and the starting position information of the index and the audio data position information each have a relative address with respect to an initial position of the multi-index audio data; and
    reproducing means for discriminating the multi-index audio data, detecting the index in response to a selection of a reproduction position from a user, and reproducing the audio data from the reproduction position according to the position information of the audio data corresponding to the index, wherein the reproducing means locates the index based on the starting position information of the index.

10. An audio data recording and reproducing method comprising:
    converting an audio signal into digital audio data;
    determining the presence or absence of a request for index generation;
    generating an index corresponding to the digital audio data in response to a request for index generation;
    storing the digital audio data;
    determining the presence or absence of a request for recording termination;

generating multi-index audio data containing a header portion, an audio data portion, and an index portion having at least one index including position information of the corresponding audio data in response to a request for recording termination, wherein generating the multi-index audio data includes generating a least a header portion, and an audio data portion, wherein the header portion has header information and initial index starting position information and wherein the index includes at least starting position information of the corresponding audio data and the following index, additional information, and position information for the additional information;

determining the presence or absence of a request for reproduction;

discriminating the multi-index audio data in response to a request for reproduction;

detecting the header and initial index starting position information of the multi-index audio data;

inputting a reproduction position;

searching an index corresponding to the reproduction position;

generating reproduction starting and terminating addresses of the corresponding audio data according to the index searched; and reproducing audio data from the reproduction starting address to the reproduction terminating address.

11. An audio data recording and reproducing apparatus comprising:

audio data recording means for receiving digital audio data and generating an index containing position information of the corresponding audio data in response to a request for generation of an index from a user, and for recording multi-index audio data containing the digital audio data and at least one index, wherein the multi-index audio data comprises:

a header indicating data quantity;

starting position information of the index;

audio data, and wherein the index includes audio data position information, and the audio data position information and the position information of the index each have a relative address with respect to an initial data position of the multi-index audio data; and reproducing means for discriminating the multi-index audio data, detecting the audio data corresponding to an index in response to a selection of reproduction position from a user, and reproducing the corresponding audio data from the reproduction position of the audio data according to the position information of the audio data corresponding to the index, wherein the reproducing means locates the index based on the starting position information of the index.

* * * * *